Patented Oct. 9, 1934

1,976,224

UNITED STATES PATENT OFFICE 1,976,224

RESINLIKE MASS AND METHOD OF MAKING SAME

Willy O. Herrmann and Wolfram Haehnel, Munich, Germany, assignor, by mesne assignments, to Chemische Forschungsgesellschaft, m. b. H., Munich, Germany, a corporation of Germany No Drawing. Application August 2, 1929, Serial No. 383,171. In Germany August 15, 1928

9 Claims. (Cl. 260—2)

This invention relates to a new type of resinlike masses and methods of making the same.

These masses may be prepared by allowing a vinyl ester to polymerize in the presence of an aliphatic halogenated hydrocarbon which is a solvent for the polymerized vinyl ester named in the following description for simplification halogen compound. This polymerization may be caused by any means suitable for polymerizing vinyl ester e. g. by exposing the mixture to light, or heat, or otherwise, with or without a catalyst.

The halogen compound acts not only as a solvent but the reaction seems to run with formation of an additive compound. It is not said that a completely stoichiometric reaction occurs as products may be obtained of very different halogen content according to the quantity of the halogen compound present while polymerizing the vinyl ester.

By using for instance vinyl ester and the unsaturated halogen compound in stoichiometric proportions products have been obtained of very stable character. They did not split off halogen even when heated in vacuo up to 100° C. or when heated in dissolved state in the presence of zinc dust. By an intensive treatment with steam hydrogen halide was developed.

The products according to this invention may be molten under normal or reduced pressure. According to the pressure and temperature used colourless or coloured glasslike masses are obtained.

A characteristic of the reaction seems to be the following. After finishing the first step of the reaction characterized by the polymerization of the vinyl ester the reaction product if dissolved in an excess of the halogen compound seems further to react with the halogen compound, for the solution, at first liquid, becomes in time more or less viscous. This increasing of the viscosity seems to be a special characteristic of the unsaturated halogen compound and has not been observed if using another organic solvent. By addition of another solvent e. g. of alcohol to the solution of the primarily formed reaction product in an excess of the halogen compound the increasing of the viscosity is hindered.

On the other hand, by adding an aliphatic halogenated hydrocarbon which is a solvent for the polymerized vinyl ester to a vinyl ester more or less previously polymerized, additive masses as described above may be obtained.

The following specific examples only illustrate the invention. The parts given are by weight.

Example I 21 parts of vinyl acetate, 14 parts of trichlorethylene and 0,4 parts of benzoyl peroxide are heated. Polymerization occurs. A solution of a slightly yellowish colour and high viscosity is obtained. After vaporizing in vacuo 28 parts of a resinlike product is obtained solid at ordinary temperature and liquid at about 120° C.

Example II

A mixture of 21 parts of vinyl acetate 21 parts of kg dichlorethylene and 0,4 parts of benzoyl peroxide are heated until polymerization takes place. A solution was obtained of slightly yellowish colour and of relatively low viscosity. The excess of liquids being vaporized by heating in vacuo 27 parts of a clear and solid resinlike product was obtained.

Instead of vinyl acetate another vinyl ester such as butyrate may be used with a similar success. The polymerization may be caused also with the same effect e. g. by exposing the mixture of the components with or without the addition of a catalyst to the action of light such as sunlight or the like.

The products obtained according to this invention are useful in the lacquer industry for insulating purposes, in the electrical industry, for any sticking or impregnating purposes, for making splinterless glass or the like. They may be used by themselves or in combination with other resinlike products or the like. The products have a good solubility in most organic solvents and a solution is easily obtainable which may be used by itself or in combination with other lacquer ingredients as a lacquer of favorable properties. These lacquers show a good and rapid drying and a good resistance to water.

The invention claimed is:

1. A resinlike mass comprising a vinyl ester polymerized in the presence of trichlorethylene.

2. A resinlike mass comprising a vinyl ester polymerized in the presence of dichlorethylene.

3. Method of making a resinlike mass which comprises polymerizing a vinyl ester in the presence of trichlorethylene.

4. Method of making a resinlike mass which comprises polymerizing a vinyl ester in the presence of dichlorethylene.

5. Method of making a resinlike mass which comprises polymerizing a vinyl ester in the presence of an aliphatic halogenated ethylene which is a solvent for the polymerized vinyl ester.

6. A resinlike mass comprising a compound of a polymerized vinyl ester and trichlorethylene.

7. A resinlike mass comprising a compound of a polymerized vinyl ester and dichlorethylene which is a solvent for the polymerized vinyl ester.

8. A resinlike mass comprising a vinyl ester polymerized in the presence of dichlorethylene which is a solvent for the polymerized vinyl ester.

9. Method of making a resinlike mass which comprises polymerizing a vinyl ester in the presence of dichlorethylene which is a solvent for the polymerized vinyl ester.

WILLY O. HERRMANN.
WOLFRAM HAEHNEL.